United States Patent Office 2,915,054
Patented Dec. 1, 1959

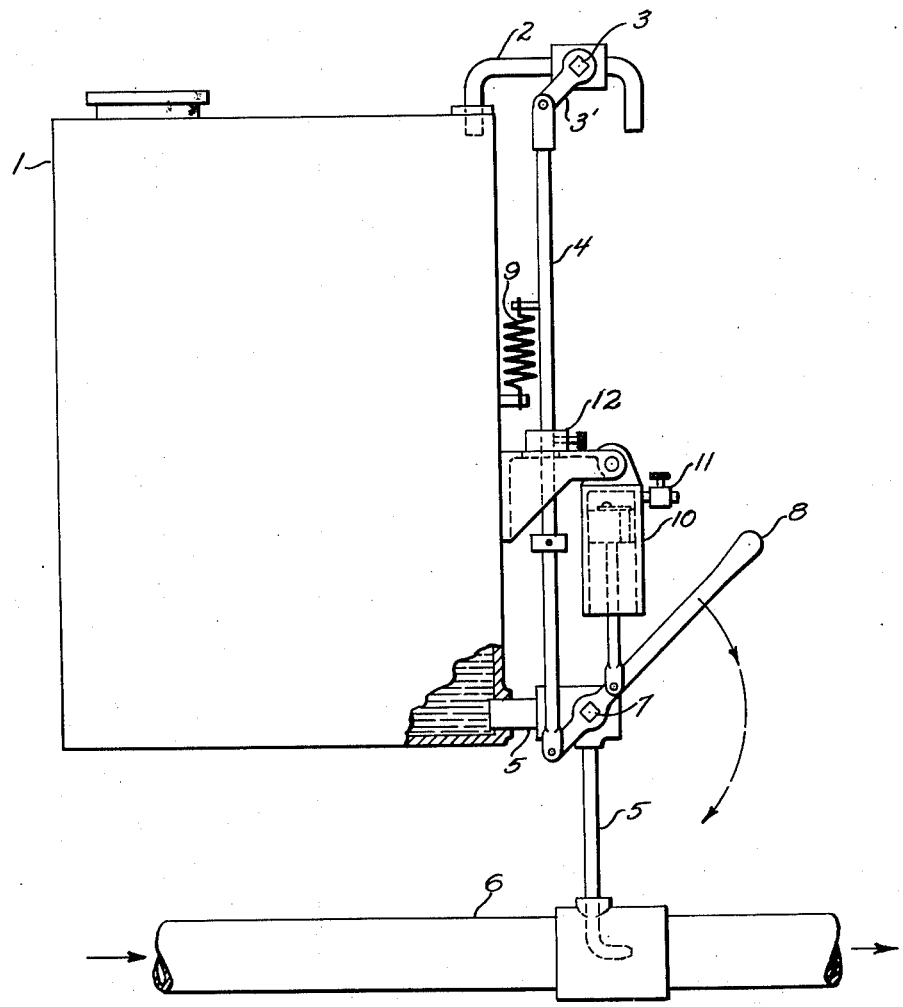

2,915,054

METHOD AND APPARATUS FOR IMPROVING DIESEL FUEL IGNITION QUALITY

Robert T. Pollock, New York, N.Y.

Application November 2, 1956, Serial No. 620,062

6 Claims. (Cl. 123—187.5)

This invention relates to the fueling of so-called high speed diesel engines and more particularly to an improved method of fueling such engines with low grade or low cetane fuels, and to apparatus for carrying out such method.

This type of engine is used almost exclusively by the railroads and also by the Navy, Army and in some other transportation uses to greater or lesser extent. This type of diesel engine has brought about a rather rigidly established specification for the fuel to be used in it. The specification fuel has a minimum ignition quality (cetane value) of 50 cetane, and numerous other restrictions of importance, such as flash point, pour point, cloud point, sulfur content, color, carbon residue, viscosity, water and sediment, ash, and distillation curve. The railroads require that these fuels also pass certain special screen tests, carried out on a high volume basis to be sure that the fuels do not clog filtering screens beyond a certain point and hence affect engine power. A diesel fuel of this type meeting these specifications is termed a "premium" diesel fuel.

With the very great increase in the use of the high speed diesel engine there is a serious growing shortage of the premium fuel. This has become so acute that the railroads, in particular, have at times been unable to meet their requirements. In addition the Government has already taken a preferential position for such premium fuel as is available. Because of this acute and increasing shortage of the premium fuel, several users, particularly the railroads, have been carrying on extensive explorations for the possible use of lower grade fuels, such, for example, as 40 cetane fuels, for their diesel engines. There is considerable merit in these explorations, for lower ignition quality fuels are lower in cost, have higher heat value (B.t.u.) and greater availability. Furthermore, many of these lower cetane value fuels have good or satisfactory specifications otherwise.

The greatest difficulty with these lower cetane fuels is in starting. Assuming a fuel has a lower ignition quality but with other specifications satisfactory, the problem resolves itself broadly around two factors. First, the means or ability to start the engine on the lower cetane fuel; and, second the ability of the engine to run satisfactorily on the lower cetane fuel once it is started. The first factor is usually met by using a premium fuel for starting. There are other factors such as carbon deposits, smoke, gum and lacquer formation, etc., with possible increase in maintenance costs, which may be tolerated to an extent but whose elimination, even with premium fuels, would be highly advantageous.

Extensive test runs made on the lower ignition quality fuels has established the important fact that, once the engine has been started on a premium fuel, and warmed up, it will run satisfactorily on the lower cetane fuel. This scheme of starting, which is old, restricts the starting ability to the conditions prevalant in the use of the premium fuel. Ignition quality of a fuel is of vital importance in the time required for starting one of these high speed engines but it is not the only requirement. For a given ignition quality (cetane number) the cranking time for starting goes up with decreasing ambient temperature, this effect being more pronounced with the low grade fuels than with the high grade fuels. Illustratively, tests have shown that a diesel engine which could be started on a given premium 50 cetane fuel in about 30 seconds of cranking time at 80° F. would require about nine minutes to start at 0° F. In comparison, a given 40 cetane fuel with which starting could be effected in about the same 30 second cranking time at 80° F., required about 16 minutes at 0° F. Thus although both fuels apparently possessed the same starting quality or "flammability-factor" at 80° F., the degradation of the flammability-factor of the fuels with decreasing temperature, as measured by the cranking time, was very much more pronounced with the low cetane fuel than with the high cetane fuel. Tests have also shown that the volatility of the fuel is not a measure of its flammability-factor.

An extremely large number of ignition quality improvers have been developed for raising the cetane value of the lower cetane fuels. These ignition quality improvers are chemicals, that is, substances which are of definite and known composition. In this respect, therefore, they differ completely from diesel engine fuels which are distillate or residue petroleum fractions of prescribed boiling range, and, in general, are composed of a mixture of hydrocarbons of indefinite and unknown composition. Unlike diesel fuels, these chemicals or chemical additives, are known to be unsuitable for use as fuels for diesel engines. Some of these chemical additives show up extremely well as ignition quality or cetane number improvers of the fuel to which they are added, while most are fair to poor. Extensive tests have been conducted with many of these chemical additives to determine their effect on engine starting. A few have shown excellent quality in this respect and provide substantial boost in the flammability-factor as well as in cetane value of the fuel. In the case of the poor starting or low flammability-factor chemical additives, the result was the same as if the fuel had not been doped with the additive. Obviously, this starting ability or flammability-factor is of prime importance and lack of it is a serious disadvantage.

Among chemical additives reported good for starting in addition to improving cetane value, may be mentioned, the thionitrates and thionitrites, some chloronitro compounds such as trichloronitromethane, chlorine, amyl and butyl nitrates, amyl nitrite, and the alkyl nitro carbamates.

Practically all cetane-increasing chemical additives are more effective in fuels in which the paraffin hydrocarbons predominate, and the higher the aromatics the lower the susceptibility in general. There are a few additives which are effective with the aromatics. Some are unstable of themselves or blended with the fuel, some are obnoxious such as for example tetranitromethane, and some are hazardous.

There is however one vital characteristic which is common to all chemical additives and that is their high cost, for in dealing with diesel fuels there is not only the question of performance but the question of economics, and this last is a uniquely determining factor in the use of the diesel engine at all.

It is of little or no advantage to raise the ignition quality of a fuel for regular running above about 50–55 cetane as the engine itself, in fact all high speed diesels, are designed with only a maximum cetane of 50 in the fuel itself, required. Users of trucks and farm equipment have little or no interest in ignition quality and this applies to the manufacturers of the trucks and farm equipment also.

Numerous patents indicate facility or equipment for feeding the cetane boosting chemical additive into the fuel oil or into the air inlet of the engine. Some of these were to circumvent blending at the refinery, some in an effort to use a poorly miscible material, but in any case the method required an average of twice as much additive as is essentially required.

It is therefore among the objects of this invention to provide a new and improved method and apparatus that will enable a high speed diesel engine to run satisfactorily on a lower cost, lower cetane value diesel fuel than is usually required—once it has started, and to enable the starting of the engine to be carried out with the same fuel through the use of a chemical additive of good starting characteristics and in such manner as to bring about the maximum economy and to achieve high efficiency with a minimum and trifling cost for the total fuel used.

In accordance with this invention there is provided a method for starting and running diesel engines on low grade diesel fuels which comprises adding to the low grade fuel during the cranking and warm-up periods a small proportion of a suitable chemical additive at least sufficient to raise the ignition quality of the fuel to a value at which the engine will start, and gradually decreasing the proportion of the chemical additive during the warm-up period until the engine reaches an operating temperature at which it will continue to run satisfactorily on the lower grade fuel.

In accordance with this invention also there is provided apparatus which, when set, will automatically feed an amount of desirable chemical additive to the fuel as it flows to the engine and automatically regularly reduce the additive charge to a lesser quantity or to zero, as may be desired.

In accordance with a presently preferred embodiment of apparatus for carrying out the process of this invention there is provided a small storage tank for liquid chemical additive of, for example, 2 to 5 gallon capacity, having variable-opening metering valve means adapted to be preset initially by the engine operator at an opening at which the liquid chemical additive will be metered as a stream and at a prescribed rate, from the storage tank into the stream of diesel fuel flowing to the engine, and which will automatically gradually close after opening at a desired rate as the engine warms up. The opening of this valve will also, preferably, open a necessary vent on the storage tank and close the same vent when the valve is closed. The valve will automatically reduce the chemical additive charge gradually from the maximum set to zero. The valve will permit easy repetition and may be set at any other point than maximum opening.

The accompanying drawing illustrates diagrammatically one form of apparatus for carrying out the process of this invention.

Referring now more particularly to the drawing there is provided a storage tank 1 having a vent tube 2 normally closed by a rotary vent valve 3 adapted to be opened and closed by a spring-pressed rod 4 pivotally connected to the valve operating lever 3'. At the bottom of the tank there is provided an additive supply pipe 5 through which liquid chemical additive in the storage tank is adapted to course under a gravity head into a pipe 6 by which diesel fuel is supplied to the fuel pumps of a diesel engine (not shown).

A rotary metering valve 7 is disposed in the additive supply pipe 5 and is adapted to be moved clockwise as shown from a fully closed position of no additive flow to a fully open position of maximum additive flow by means of an opening lever 8 secured intermediate its ends to the metering valve 7, and secured pivotally at its inner end to the rod 4.

The rod 4 is connected by a coil return-spring 9 to the tank so as to tension the spring upon clockwise opening movement of the valve. Thus, when the opening lever 8 is released following opening of the valve, the return-spring 9 will tend to close the valve by effecting counter-clockwise movement of the lever and hence the valve 7.

Valve-controlled dash-pot means 10 having a control valve 11, control the rate at which the metering valve 7 closes. Other means of controlling the closing of the metering valve such, for example, as a friction brake on the valve, or a spring-driven escapement for the valve may be employed as will be apparent to those skilled in the art.

Advantageously, the rod 4 is provided with axially adjustable stop means 12 which may be set to prevent complete closure of the valve 7 so as, if desired, to permit of a metered fixed quantity of additive for "clean-up" purposes to continue to flow through the valve into the fuel supply line 6 even after the engine has warmed up.

The vent valve operating rod 4 is connected to the opening lever 8 and the vent valve lever 3' so that clockwise opening movement of the valve will also open the vent valve 3 when the metering valve is open. Similarly, closing of the metering valve will close the vent valve.

Desirable chemical additives for use in connection with this invention are those which are normally liquid or which may be liquified by means of a suitable solvent for addition to the fuel. Preferred chemical additives are the alkyl nitro carbamates such as are disclosed in my U.S. Patent No. 2,438,452 and I particularly prefer N-methyl, N-nitro, methyl carbamate which may be manufactured relatively cheaply from low cost methanol but provides a very high cetane boost and has a high flammability-factor. This additive is normally unstable for use where it would be required to be blended with large amounts of fuel and stored pending use since it allies itself with water in storage and becomes ineffective. However, in accordance with this invention where such a normally undesirable chemical additive is supplied to the fuel primarily only during the warm-up period until the engine has achieved a satisfactory operating temperature, this additive and others of like characteristics are highly advantageous.

The alkyl nitro carbamates have the very definite additional advantage that, in use, they also reduce carbon deposits, lacquer, odor and smoke so that it may be desirable to make short runs using the chemical additive after operating temperature has been reached and to take advantage of this particular benefit of maintenance. The metering valve apparatus of this invention will enable this to be done.

Quick and complete miscibility of the additive with the fuel is of considerable importance since the time during which the additive is supplied to the fuel is brief, the quantity is small and is being rapidly reduced. Also the matter of stability, fire hazard, etc., of the additives employed has importance. Some additives, a few, present a satisfactory situation on these points.

Although the nitro alkyl carbamates lend themselves particularly to the carrying out of the diminishing concentration process of this invention, advantage resides in the use of normally unusable organic sulfur compounds particularly amyl thionitrite, tertiary butyl thionitrite and ethyl thionitrite, whose use has heretofore been deemed impractical because of their corrosive properties. These particular organic sulfur compounds are almost 50% more effective than the well known additives amyl nitrite, amyl nitrate and the alkyl-nitrocarbamates. They have the unusual property of providing a substantial cetane boost for low cetane—high aromatic diesel fuels. It is known that ordinary high cetane stocks are highly paraffinic and/or naphthenic in character and additives such as the alkyl nitrate carbamates, amyl nitrate and the like are not very effective for low cetane aromatic stocks. However, in the use of these organic sulfur compounds in accordance with this invention only a very small amount of the additive, say 1% to 3% by weight or less, is used for starting only. Hence in such small quantities the chemical additive will not be corrosive and this is particularly so because of the short time during which the additive is used.

As a solvent for incorporating such organic sulfur compounds in the fuel I may use liquid mineral spirits such for example as petroleum naphthas, but preferably I employ petroleum benzin which is a pentane-hexane mixture, or commercial di-ethyl ether which in itself has excellent cetane-boost properties and starting properties for such fuels. Thus, it is a further feature of this invention that in the treatment of low ignition quality highly aromatic fuels, the amount of additive used is in proportion to the aromatic content of the fuel, the higher the aromatic content the higher the proportion of additive employed. The ability to increase the ignition quality of such fuels is of substantial importance by reason of the fact that such low ignition quality fuels have a much higher B.t.u. content than the higher quality paraffinic and/or naphthenic type diesel fuels. It follows that in being able to render such aromatic fuels stable for use in running of high speed diesel engines in which they would be normally unsuitable, considerable advantages are obtained not only as respects savings in fuel cost but in the realization of higher power output per pound of fuel supplied.

In general, I have found that, for starting, there is little or no advantage in boosting the cetane of the low grade fuel to above 60 to 65 cetane. For low grade fuels of, for example, 40–41 cetane, an addition of around 1% by weight of the chemical additive is generally sufficient to effect a cetane increase of from 13 to 16 points. Thus the necessary quantity of chemical additive will be in the range of from about 0.1% to about 3% by weight of the fuel depending on the maximum cetane boost required. If the fuel is high in aromatics, a larger quantity may be required, for example, 2% instead of 1%.

The invention in its broader aspects is not limited to the specific combinations, improvements, instrumentalities and process described but departures may be made therefrom within the scope of the accompanying claims without departing from the principles of the invention and without sacrificing its chief advantages.

What is claimed is:

1. A process for starting and running diesel engines on diesel fuels having a cetane value below about 50 cetane, which comprises adding to the fuel as it is fed to the engine during the cranking and warm-up periods, a small proportion of a flammability-increasing chemical additive, at least sufficient to raise the flammability-factor of the fuel to a value substantially equal to that of a premium diesel fuel at substantially the same ambient temperature, and gradually decreasing the proportion of additive during the warm-up period until the engine reaches an operating temperature at which it will continue to run satisfactorily on the low grade fuel.

2. The process of claim 1 in which the addition of additive is discontinued when the engine reaches its normal engine-operating temperature.

3. The process of claim 1 in which the proportion of additive initially added to the fuel is in excess of 1% by weight of the fuel and is decreased during the warm-up period until the amount of additive present is in the range of from about 0.1% to about 1% by weight of the fuel.

4. The process of claim 1 including establishing the proportion of additive initially added during the warm-up period as a function of the aromatic content of the fuel.

5. The process of claim 1 in which the fuel is paraffinic, in which the additive is a nitro-alkyl carbamate, in which the proportion of the carbamate added during the cranking period is in excess of about 1% by weight of the fuel and in which the proportion of the carbamate added during the warm-up period is gradually decreased until the proportion added is in the range of from about 0.1% to about 1% by weight of the fuel.

6. The process of claim 1 in which the addition is continued for a short time after the engine reaches its operating temperature, for effecting clean operation of the engine and reduction of carbon deposition, lacquer formation, odor and smoke.

References Cited in the file of this patent
UNITED STATES PATENTS

| | | |
|---|---|---|
| 2,175,743 | Coffman | Oct. 10, 1939 |
| 2,720,869 | Bevans | Oct. 18, 1955 |
| 2,758,579 | Pinotti | Aug. 14, 1956 |
| 2,793,629 | Neely | May 28, 1957 |